United States Patent [19]

Afromowitz

[11] Patent Number: 4,627,172

[45] Date of Patent: Dec. 9, 1986

[54] INCLINOMETER HAVING TWO DEGREES OF FREEDOM

[75] Inventor: Martin A. Afromowitz, Seattle, Wash.

[73] Assignee: Innovation Associates, Bellevue, Wash.

[21] Appl. No.: 641,790

[22] Filed: Aug. 17, 1984

[51] Int. Cl.[4] .................................................. G01C 9/06

[52] U.S. Cl. ........................................ 33/366; 33/392; 33/395; 33/402

[58] Field of Search ................. 33/366, 391, 392, 395, 33/402; 346/76; 350/96.3, 96.34

[56] References Cited

U.S. PATENT DOCUMENTS

| | | | |
|---|---|---|---|
| 1,597,487 | 8/1926 | St. Clair | 346/76 |
| 2,447,344 | 8/1948 | Kliever | 177/351 |
| 2,665,896 | 1/1954 | Kirby et al. | 264/1 |
| 2,802,956 | 8/1957 | Jarosh et al. | 33/366 X |
| 2,974,532 | 3/1961 | Goshen et al. | 73/516 |
| 3,011,384 | 12/1961 | Biber | 33/366 X |
| 3,097,565 | 7/1963 | Kupelian | 33/366 X |
| 3,146,057 | 8/1964 | Rona | 346/108 |
| 3,224,279 | 12/1965 | Galli et al. | 33/366 X |
| 3,310,978 | 3/1967 | Davis | 73/70.2 |
| 3,372,386 | 3/1968 | Klinger | 33/366 X |
| 3,537,307 | 11/1970 | Pliha | 33/366 X |
| 3,540,268 | 11/1970 | Kantola et al. | 73/71 |
| 3,657,551 | 4/1972 | Lingert et al. | 33/366 X |
| 3,659,915 | 5/1972 | Maurer et al. | 350/96.3 |
| 3,848,750 | 11/1974 | Hoge | 212/69 |
| 3,935,643 | 2/1976 | Russell et al. | 33/366 X |
| 4,028,815 | 6/1977 | Buckley et al. | 33/366 |
| 4,088,388 | 5/1978 | Nakahara et al. | 350/96.3 |
| 4,159,422 | 6/1979 | Okubo | 33/366 X |
| 4,239,963 | 12/1980 | August et al. | 250/231 R |
| 4,254,334 | 3/1981 | Baud | 250/231 R |
| 4,321,464 | 3/1980 | Miller | 250/231 |
| 4,437,727 | 3/1984 | Treber | 350/96.3 |

FOREIGN PATENT DOCUMENTS

| | | | |
|---|---|---|---|
| 2439440 | 8/1980 | France . | |
| 56-87815 | 7/1981 | Japan | 33/366 |
| 862045 | 3/1961 | United Kingdom | 33/366 |
| 2074315 | 10/1981 | United Kingdom | 33/366 |
| 672485 | 7/1979 | U.S.S.R. | 33/366 |

OTHER PUBLICATIONS

"Application of Optical Fibers to the Transmission of Solar Radiation", Kato et al., *Journal of Applied Physics*, vol. 47, No. 10, Oct. 1976, pp. 4528–4531.

"The Physical Properties of Glass", D. G. Holloway, University of Keele, The Wykeham Science Series, Wykeham Publications (London) Ltd, London and Winchester 1973, pp. 140 and 141.

*Primary Examiner*—Robert S. Ward

*Attorney, Agent, or Firm*—Gregory W. Moravan

[57] ABSTRACT

An inclinometer, adapted to be rigidly secured to an object, for detecting the amount and direction of the inclination of the object in any direction with respect to a horizontal or other reference plane. The inclinometer comprises a fiber optic rod rigidly mounted at one of its ends and having a weight secured to its free end. The free end of the rod has two degrees of freedom of motion with respect to its rigidly mounted end. Light is supplied to the rod's mounted end and light emitted from the rod's free end falls on a continuous two dimensional optical detection surface area of an optical detector which uniquely detects the position of the spot of light falling anywhere on its surface area, regardless of the direction in which the spot of light moves on its surface area. From the position of the spot of light on the surface area, the amount and direction of inclination of the object can be determined. Undesired oscillations of the free end of the optical fiber rod, caused by acceleration of the inclinometer, are reduced by surrounding the rod and/or weight with a viscous liquid, and/or by also providing fins on the weight to increase its fluid resistance. A temperature sensor allows for correction of the inclination angle detected caused by changes in temperature of the inclinometer. A pure fused silica optical fiber rod is preferred, to prevent undesired hysteresis which might otherwise be caused by an elastic deformation of the optical fiber rod.

9 Claims, 3 Drawing Figures

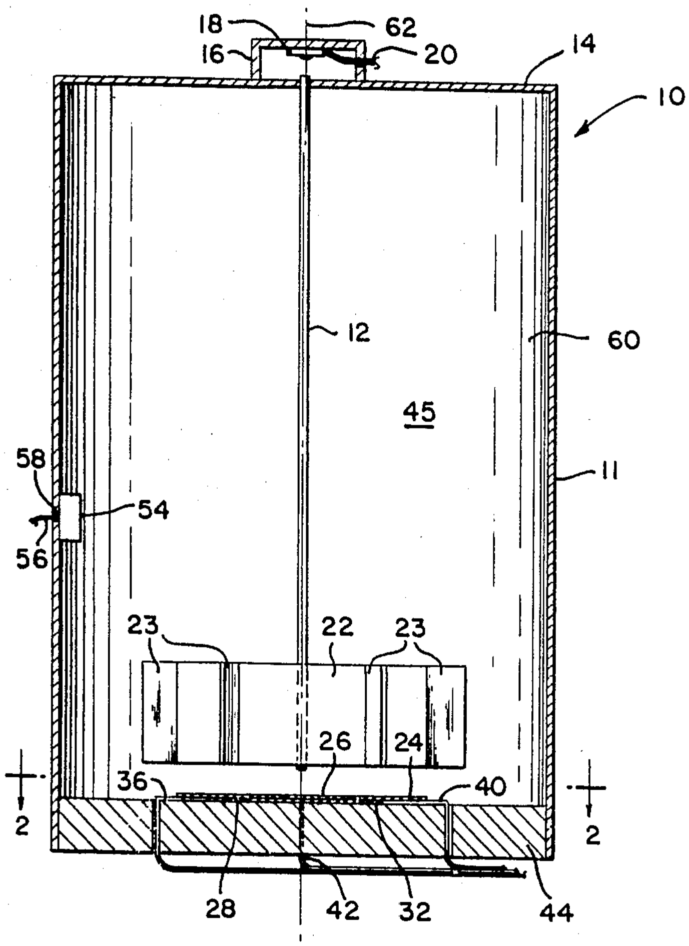
FIG. 1
FIG. 2
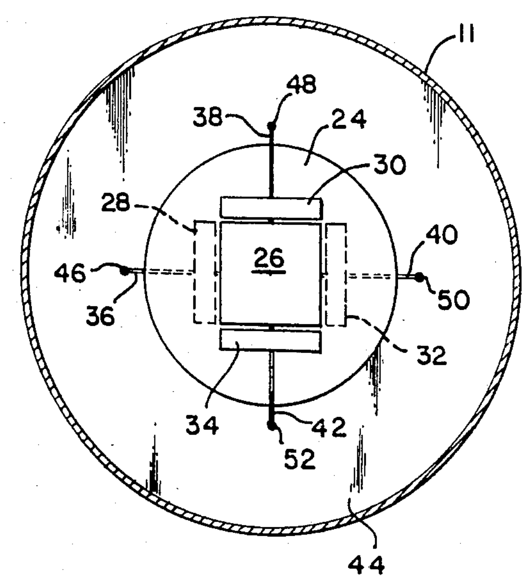
FIG. 3
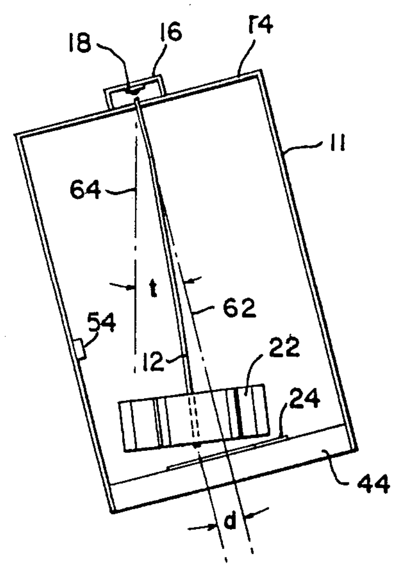

INCLINOMETER HAVING TWO DEGREES OF FREEDOM

BACKGROUND OF THE INVENTION

The invention relates to inclinometers, and in particular, to an inclinometer having two degrees of freedom.

BRIEF SUMMARY OF THE INVENTION

The primary object of the present invention is to provide an inclinometer having two degrees of freedom such that when the inclinometer is inclined at any angle with respect to a horizontal or other reference plane, the inclinometer will accurately and reliably detect the magnitude and direction of such inclination.

Another object is to provide an inclinometer which is temperature compensated.

A further object is to provide an inclinometer which is damped, so that the effects of transient accelerations will not induce errors in its long term measurement of inclination.

In basic form, the inclinometer of the present invention includes a hollow, rigid housing. Located within the housing is a thin round rod of pure fused silica, a material extremely transparent to light, the top end of which is mounted in and penetrates the top wall of the housing. A light source is placed adjacent the top end of the rod so light is transmitted through the rod. A cylindrical weight is secured to the bottom end of the fused silica rod so that the bottom end of the rod passes through the center of gravity of the weight.

Within the housing, beneath and spaced away from the bottom end of the rod, is an optical detector upon which shines light transmitted through the rod. The optical detector is constructed in such a way that the location of the spot of light falling on it can be uniquely and accurately determined from the output signals generated by the optical detector.

Preferably, the weight is provided with fins or other projections and the housing is filled with a viscous, transparent fluid which act to damp undesired oscillations of the rod and weight. These projections can also limit the extent of travel of the weight, as for example when the inclinometer is stored in an inverted orientation.

In addition, an electronic temperature sensing device is preferably located within the housing to provide an output signal which can be used to correct for changes in sensitivity or calibration of the inclinometer which result from changes in environmental temperature.

In use, the inclinometer is rigidly secured, in any convenient fashion, with respect to the object whose inclination is to be measured. As the object, and hence the inclinometer, are inclined in any direction, gravity causes the bottom end of the fused silica rod to deflect in a unique way which is related to the amount and direction of inclination. Such deflections cause the spot of light to move to different locations on the optical detector. This, in turn, causes variations in the output signals of the optical detector from which the amount and direction of inclination of the inclinometer, and hence of the object to which it is affixed, from any previously fixed orientation can be accurately measured.

The foregoing is not intended to be an exhaustive catalog of the various objects, features, advantages and characteristics of the invention since these and other objects, features, advantages, and characteristics of the invention will be directly or inherently disclosed by the following materials forming a part hereof.

BRIEF DESCRIPTION OF THE DRAWINGS

FIG. 1 is a schematic side elevational view of the invention with parts broken away for a better view of its various components;

FIG. 2 is a schematic top elevational view of the optical sensor used in the invention, taken along line 2—2 of FIG. 1; and FIG. 3 is a schematic side elevational view of the invention shown tilted.

DETAILED DESCRIPTION OF THE INVENTION

For clarity, the structure of the inclinometer of the present invention will be addressed first, followed by a discussion of its operation, theory, and criteria used in the selection of certain of its components.

Referring to FIGS. 1 and 2, the inclinometer, generally designated as 10, includes a rigid housing 11 preferably made from a metal of high thermal conductivity, such as aluminum. The housing 11 is illustrated as being cylindrical in shape, but housings of other shapes could be used.

The upper end of a thin, normally straight, cylindrical rod 12 of fused silica extends through a hole in the top wall 14 of the housing 11, and is rigidly secured thereto, such as, for example, by using a very rigid setting epoxy such as Epotek H-72 epoxy made by Epoxy Technology, Inc., P.O. Box 567, Billerica, Mass.

The rod 12 is made from fused silica which is preferably extremely pure and clear, having less than 0.25% light loss per meter of length. A suitable rod 12 may be prepared from an optical fiber cable product called Fibropsil QFS0 400, made by the Quartz and Silica Division of Fibres Optique, located at Avenue du 11 Novembre, 45300 Pithiviers, France. To prepare the rod 12, the optical fiber cable is cut to the desired length and its ends cleaved and polished using conventional techniques, leaving the desired length of optical fiber cable with the surface of each of its ends oriented perpendicularly with respect to its longitudinal axis. The plastic sheath of said product is then removed with a sharp blade. The silicone cladding is then removed by treating with concentrated sulfuric acid, or by pulling gently with the fingernails, leaving the bare fused silica rod 12. By way of non-limiting example, the rod 12 may be 1.35 inches long and have a diameter of 0.4 mm.

Secured to the top wall 14 of housing 11 above the upper end of the rod 12 is a smaller housing 16 within which is mounted a light source 18 such as, for example, a light emitting diode (LED). A suitable LED is part number VTE 7124 IR LED made by Vactec, Inc., located at 10900 Page Boulevard, St. Louis, Mo. 63132. The housing 16 is preferably light tight, to prevent the undesired entry of outside light.

The light source 18 is mounted directly above and close to the upper end of rod 12 so that the light it emits will be coupled efficiently to rod 12. The light so coupled will travel down rod 12 and will emerge in a circular cone of light from the lower end of rod 12.

The electrical connections 20 of light source 18 penetrate housing 16 in a light proof seal and are adapted to be connected to a suitable source of power.

The lower end of rod 12 passes through and is rigidly secured to a generally cylindrical weight 22 which, by way of non-limiting example, may be made from brass, and have a diameter of 0.5 inches, and a height of 0.2 inches.

Weight 22 is secured to rod 12, such as by using a very rigid setting epoxy as was described above. In order to provide uniform deflection of the weight 22 and rod 12 as the inclinometer 10 is inclined any given amount in any direction, it is important that the rod 12 extend through the center of gravity of weight 22.

The weight 22 may be provided with a plurality of outwardly extending fins 23 for a purpose which will be discussed below. The term "fin" is used very broadly to include any sort of projections or shaping of the weight 22 which enhance its resistance to movement through a fluid.

Centered beneath the lower end of rod 12 and spaced away from it by about 0.05 inches, for example, is an optical detector 24 having a light-sensitive surface 26; four contact pads 28, 30, 32, 34 electrically connected to optical detector 24; and four electrical connections 36, 38, 40, 42, each contact pad being connected to one electrical connection, respectively. The detector 24 is secured to a plug 44 which is, in turn, secured to housing 11, such as by use of epoxy as was described above. Electrical connections 36–42 from the pads 28–34 exit plug 44 through holes 46, 48, 50, 52 provided therein for this purpose, the holes being sealed with epoxy as was described above. The housing 11 and plug 44 preferably make the chamber 45 within the housing 11 fluid and light tight.

A suitable detector 24 has a light-sensitive surface 26 by way of example having about $4\times4$ $mm^2$ area, and is a lateral photodetector made by Sitek Laboratories AB, Box 24122, 400 22 Goteborg, Sweden. The optical detector 24 is constructed so that the output current from any contact 28–34 will increase or decrease linearly as the centroid of a spot of light falling on light-sensitive surface 26 from the lower end of rod 12 moves closer to or further away from that contact 28–34. Thus the optical detector 24 generates currents that can be used to uniquely determine the position of the spot of light anywhere on its light-sensitive surface 26.

The output signals of the detector 24 are carried from the inclinometer 10 by electrical connections 36–42. Electrical connections 36–42 are adapted to be connected to any suitable signal processing equipment which will provide a read out of the amount and direction of inclination of the inclinometer 10 based on the output signals they carry.

Mounted to the sidewall of the housing 11 is a temperature sensor 54 whose electrical connections 56 exit the sidewall of housing 11 through a hole 58 therein. Sensor 54 is mounted to the sidewall of the housing 11, and the hole 58 is sealed, as by using epoxy as was described above, for example, to make a light and fluid tight seal. A suitable sensor 54 is an AD590 temperature transducer made by Analog Devices, Inc., Two Technology Way, Norwood, Mass. 02062.

The housing 11 of the inclinometer 10 is preferably filled with a relatively viscous, clear liquid 60, such as Dow-Corning 200 Fluid, made by the Dow-Corning Corporation of Midland, Mich. 48640. The liquid 60 must have an index of refraction which is less than that of the material that comprises rod 12. The housing 11 may be filled with liquid 60 by any convenient means, such as by filling it through a hole (not illustrated) provided in the top wall 14 of the housing, and then sealing the hole with epoxy, as was described above, to provide a fluid and light tight seal. The term "clear" is used in relation to the liquid 60 in the sense that the liquid 60 is preferably transparent to whatever light is produced by the light source 18, so as not to unduly reduce the amount of light reaching the light-sensitive surface 26 of optical detector 24 from the lower end of rod 12.

Assembly of the inclinometer 10 will not be described since its assembly will be readily apparent to one of ordinary skill in the art in view of the disclosures contained herein.

Now that a description of the structure of the invention has been given, its manner of operation, theory, and the criteria for the selection of some of its components will be addressed below.

Referring to FIG. 1, it is preferred, but not required, that the weight 22 be mounted to the rod 12 so that the longitudinal axis of the rod 12 passes through the center of gravity of weight 22. It is also preferred, but not required, that the rod 12 be rigidly mounted to the upper wall 14 of the housing 11 in a way such that when the inclinometer 10 is oriented vertically, gravity will position the longitudinal axis of rod 12 so that it passes through the center of light-sensitive surface 26. For example, it is preferred, but not required, that rod 12 be positioned so that its longitudinal axis is coincident with the longitudinal axis 62 of housing 11. These objectives can be reached, for all practical purposes, by carefully mounting the weight 22 and rod 12, and by selecting rod 12 to be as straight as possible.

When the inclinometer 10 is inclined in any direction away from vertical, the stiffness of rod 12 will tend to hold the rod on axis 62, but the weight 22 at its end will tend to cause the rod 12 to bend. Thus, a balance of forces in the rod 12 and weight 22 will cause the lower end of rod 12 to be displaced some distance away from the axis 62 which is shown inclined in FIG. 3 in the direction of the incline of the inclinometer 10, and in an amount described below.

With reference to FIG. 3, it can be shown that for small amounts of displacement d of the lower end of the rod 12 from axis 62 the angle of inclination t of the inclinometer 10 is given approximately by:

$$t=\sin^{-1}[d(1/C+1/L)] \quad \text{(equation 1)}$$

where $$C=gML^3/3EI \quad \text{(equation 2)}$$

In the above equations:

- t = Angle of inclination in degrees of axis 62 and inclinometer 10 from the vertical straight line 64 in FIG. 3;
- L = length of rod 12;
- g = gravitational acceleration = 980 $cm/sec^2$;
- M = mass of weight 22;
- E = Young's modulus of rod 12 (Modulus of Elasticity); and
- I = second moment of cross-sectional area of rod 12.

The product of EI is also known as the flexural rigidity of the rod 12. For a cylindrical rod, the flexural rigidity is equal to $1/64\ E\pi r^4$, where r is the radius of the rod 12.

Thus, if the displacement d of the lower end of rod 12 is determined from the position of the centroid of the light spot on the light-sensitive surface 26, it is possible to infer from equation 1 the angle t at which the inclinometer 10 is inclined. The inclinometer 10 provides an optical device for inferring the displacement d of the lower end of rod 12 from which, in turn, the angle t at which the inclinometer 10 is inclined can be determined from equation 1.

The sensitivity of the inclinometer 10 to inclination is governed by the selection of the material, diameter and length of rod 12, by selection of the mass of weight 22, by the selection of the viscous fluid 60, and by selection of the distance between the lower end of rod 12 and the light-sensitive surface 26 of the optical detector 24.

In operation of the inclinometer 10, light from the light source 18 is coupled efficiently to rod 12. Since rod 12 is fabricated from fused silica, an extremely clear optical material, the light so coupled will travel down rod 12 and will emerge in a circular cone or beam of light from the lower end of rod 12.

The beam of light emerging from rod 12 falls as a spot of light on the two-dimensional light-sensitive surface 26 of optical detector 24 which generates output currents, in response thereto, in each of its four contact pads 28–34 and their associated electrical connections 36–42. The amplitudes of these output currents depend on the intensity of light falling on the light-sensitive surface 26 of the optical detector 24, and on the position of the centroid of the light spot falling on the light-sensitive surface 26. As the light spot moves on the light-sensitive surface 26 because of displacement of the lower end of rod 12 from the axis 62 caused by inclination of the inclinometer 10 through angle t, we can infer the displacement d by measuring the output currents coming from each of the four electrical connections 36–42.

The technique for determining the position of the centroid of the light spot on the two-dimensional light-sensitive surface 26 is well known. FIG. 2 shows optical detector 24, which consists of a light-sensitive surface 26 and four contact pads 28–34 positioned parallel to the four sides of the light-sensitive surface 26. By way of example, contact pads 28, 32 may be on the top surface of the optical detector 24, while pads 30, 34 may be on its bottom surface. The optical detector 24 is constructed so that the output current from any contact pad 28–34 will increase or decrease linearly as the centroid of a spot of light falling on light-sensitive surface 26 moves closer to or away from any particular contact pad 28–34. Those of ordinary skill in the art will see that the position of the centroid of the light spot on light-sensitive surface 26 can be accurately determined by measuring the difference between currents coming from opposite contact pads 28–34, and dividing by the total current generated by the optical detector 24.

It should be noted that any inclination of the inclinometer 10 from vertical requires two quantities for its complete description. For example, having defined a particular direction in the horizontal plane as "North", one could specify an arbitrary inclination as having a "north-south component", $\text{inclination}_N$, and an independent "east-west component", $\text{inclination}_E$. These two inclination angles uniquely define the orientation of the inclinometer 10. By defining the direction "North" as the direction from the center of light-sensitive surface 26 to pad 30, for example, then $\text{inclination}_N$ will be determined from the difference in currents coming from pads 30 and 34, and $\text{inclination}_e$ will be determined from the difference in currents coming from pads 28 and 32.

Turning now to other matters, it should be noted that temperature changes can affect the inclinometer 10 in several ways. First, the intensity and wavelength of light emitted by the light source 18 are generally functions of its temperature. Additionally, the sensitivity of light-sensitive surface 26 is generally a function of its temperature. Thus, for a given displacement d of the centroid of the light spot falling on light-sensitive surface 26, the currents measured at each pad 28–34 will be functions of the temperature of light source 18 and light-sensitive surface 26.

Measuring the difference between currents coming from opposite pads 28–32 and dividing by the total current generated by optical detector 24 serves to reduce errors in determining displacement d caused by variations in the temperature of light source 18 and light-sensitive surface 26. Errors that remain will be caused by any non-linearities in the optical detector 24, which must be measured as a function of its temperature.

In addition, the flexural rigidity of rod 12 (the product EI in equation 1) is a function of its temperature, mainly through the temperature dependence of its Modulus of Elasticity E. Thus, for a fixed angle of inclination t of the inclinometer 10, the displacement d will vary with temperature, mainly through the variation of the Modulus of Elasticity, quantity E in equation 2.

A temperature change may also result in dimensional changes caused by thermal expansion or contraction of the housing 11, rod 12, and other components of the inclinometer 10. These dimensional variations are expected to yield insignificant variations in the sensitivity and calibration of the inclinometer 10, by comparison with the effects described above.

Since the housing 11 is preferably fashioned from a metal of high thermal conductivity, it may be assumed that all temperature-sensitive components of the inclinometer 10 will be at substantially the same temperature in most instances. Thus, the temperature sensor 54 placed within housing 11 can be used to determine the temperature of inclinometer 10, and its components. Once the temperature of inclinometer 10 is determined, electronic correction of the inclination measurements over the inclinometer 10's temperature operating range may be implemented by standard calibration techniques.

Turning now to other matters, it should be noted that the combination of rod 12 and weight 22 comprise a strongly oscillating mechanical structure with well-defined resonances. These mechanical resonances or oscillations can be excited by mechanical motion such as acceleration of the inclinometer 10. These oscillations will be superimposed on the displacement d of the lower end of rod 12 which results from inclination of the inclinometer 10. When the inclinometer 10 is in use, oscillating motion of the free end of rod 12 constitutes a source of undesired interfering signals when this motion is detected by the light-sensitive surface 26 of optical detector 24.

Thus, it is advantageous to increase the damping of the resonant mechanical structure comprising the rod 12 and weight 22. This may be accomplished by filling housing 11 with a liquid 60 of selected viscosity, as has been described above. It is also necessary that this liquid 60 be transparent to the light emitted by light source 18, since the light coupled through rod 12 must pass through a certain thickness of the liquid 60 before falling on light-sensitive surface 26. The liquid 60 must also maintain suitable viscosity and optical transparency over the desired temperature operating range of the inclinometer 10. The fins 23 on weight 22 help to increase the viscous damping of the resonant mechanical structure of the weight 22 and rod 12. It is preferred that the viscosity of the liquid 60 be such that the resonant mechanical structure is approximately critically damped.

Turning now to another matter, since it is preferred that inclinometer 10 yield stable measurement outputs of inclination over long perids of time and with a high degree of measurement repeatability, the inclinometer 10 must incorporate unique features which yield a highly stable mechanical structure. One of these unique features is the choice of materials used to fabricate rod 12.

Most materials known to man exhibit a phenomenon known as anelastic deformation. Assume for the moment that rod 12 is made of some material other than pure fused silica. Let the inclinometer 10 be held vertical from a long period of time so that the axis of rod 12 assumes a truly vertical position. Then let the inclinometer 10 be inclined to a new position. The lower end of rod 12 will displace within the housing 11 by a calculable displacement d. If this new position is held for a long period of time, the constant stress on the rod 12 will result in a further and slow increase in displacement d. This further displacement results from stress-induced movement of atomic defects or impurities in rod 12. After the inclinometer 10 is brought back to its first vertical position, the lower end of the axis of rod 12 will have a small displacement from the truly vertical position it should occupy. This small displacement reflects the incremental displacement which rod 12 suffered while held in its earlier inclined position. After a period of time, this incremental displacement will disappear and the axis of rod 12 will attain a truly vertical position again.

The net effect of this so-called anelastic deformation is to give the inclinometer 10 a time dependent hysteresis, which is incompatible with its stable and accurate measurement of inclination. One material, pure fused silica, has been found to be an excellent material to use for rod 12. It is perfectly elastic, and does not suffer from anelastic deformation because its impurity concentration is extremely low. Thus, a unique feature of the invention is the design of rod 12 using fused silica of the highest purity.

Fused silica is generally available in the desired cylindrical rod-like form. It is a common component in so-called optical fibers. Most optical fibers, however, are fabricated with a core of a first optical material, and have a concentric cladding or coating of a second optical material. In many optical fibers, the core is an impure glass or plastic, and the cladding is a second impure glass or plastic material of lower index of refraction. It should be noted that in the present invention, neither of these kinds of optical fibers would be usable. The glass or plastic core, cladding, or other coating would result in an anelastic component on rod 12, and would cause an undesired hysteresis in the measurement of inclination by the inclinometer 10.

As used herein, the term "rod" 12 is used in its broadest form, and includes any means for accepting, conveying and transmitting light regardless of its cross-sectional configuration, and regardless of how it accepts, conveys and transmits light. The critical properties of the rod are that it be at least nearly perfectly elastic and not appreciably affected by anelastic deformation, and that it be able to accept, convey and transmit light from a light source 18 to the optical detector 24.

From the foregoing it will also be appreciated that the inclinometer 10 can also be used to detect inclination along only one axis. In such a case, a linear optical detector (not illustrated) could be used, only one pair of opposing contact pads 28, 30, 32, 34 could be used, or suitable signal processing equipment could be used which would respond to only one pair of opposing contact pads 28–34. Naturally the housing 11 would be marked with suitable indicia (not illustrated) which would indicate the direction of the one sensitive axis of the inclinometer 10, to aid in proper orientation of the inclinometer 10 when it is mounted to the object whose inclination is to be detected.

What is claimed is:

1. An inclinometer comprising:

a housing means defining an internal chamber;

means for producing a light beam, wherein said means for producing a light beam are at least partially located within said chamber and have one end rigidly supported by said housing means; and an optical detector means secured to said housing means and located to be adapted to receive a spot of light from said means for producing a light beam;

wherein at least a portion of said means for producing a light beam is free to move, with respect to its said rigidly supported end, in two degrees of freedom of motion under the influence of gravity in response to any inclination of said inclinometer, to enable the light beam it produces in operation to correspondingly move in two degrees of freedom of motion;

wherein said optical detector means has an at least substantially continuous light-sensitive surface area fashioned to measure the position of said spot of light when moving in said two degrees of freedom of motion;

wherein said optical detector means uniquely detects the position of said spot of light falling entirely anywhere on its said light-sensitive surface area regardless of the direction in which said spot of light moves on said light-senstive surface area;

wherein said position of said spot of light falling on said light-sensitive surface area provides an indication, through the output signals generated by said optical detector in response to said spot of light, of the amount and direction of the inclination of said inclinometer;

wherein said means for producing a light beam comprise an optical rod and means for producing a light; wherein one end portion of said optical rod is rigidly secured to said housing; wherein said means for producing a light is secured to said housing means in a location to enable light it produces to be coupled to said optical rod; and wherein said optical rod is fabricated from an at least nearly perfect elastic material which is not appreciably affected by anelastic deformation.

2. An inclinometer comprising:

a housing means defining an internal chamber;

means for producing a light beam, wherein said means for producing a light beam are at least partially located within said chamber and have one end rigidly support by said housing means; and an optical detector means secured to said housing means and located to be adapted to receive a spot of light from said means for producing a light beam;

wherein at least a portion of said means for producing a light beam is free to move, with respect to its rigidly supported end, in at least one degree of freedom of motion under the influence of gravity in response to any inclination of the inclinometer, to enable the light beam it produces in operation to correspondingly move in at least one degree of freedom of motion;

wherein said optical detector means has an at least substantially continuous light-sensitive surface area fashioned to measure the position of said spot of light when moving in said at least one degree of freedom of motion;

wherein said optical detector means uniquely detects the position of said spot of light falling entirely anywhere on its said light-sensitive surface area;

wherein said position of said spot of light falling on said light-sensitive surface area provides an indication, through the output signals generated by said optical detector in response to said spot of light, of the amount and direction of the inclination of said inclinometer; and wherein said means for producing a light beam comprise an optical rod and means for producing a light; wherein one end portion of said optical rod is rigidly secured to said housing; wherein said means for producing a light is secured to said housing means in a location to enable light it produces to be coupled to said optical rod; and wherein said optical rod is fabricated from an at least nearly perfect elastic material which is not appreciably affected by anelastic deformation.

3. An inclinometer according to claims 1 or 2 wherein said optical rod is fabricated from at least nearly perfectly pure fused silica which is at least nearly perfectly elastic and is not appreciably affected by anelastic deformation.

4. An inclinometer according to claims 1 or 2, wherein said housing means further comprises temperature sensor means for detecting the temperature of said inclinometer and for producing output signals adapted to be used to correct for changes in said output signals of said inclinometer due to changes in the temperature of said inclinometer.

5. An inclinometer according to claims 1 or 2, wherein said housing means further comprises a liquid at least partially surrounding said means for producing a light beam, to help to substantially eliminate undesired oscillations of said means for producing a light beam caused by acceleration of said inclinometer.

6. An inclinometer according to claims 1 or 2 further comprising a weight secured to said means for producing a light beam at a location spaced away from said one end of said means for producing a light beam, and wherein the longitudinal axis of at least a portion of said means for producing a light beam passes through the center of gravity of said weight.

7. An inclinometer according to claim 6, wherein said housing means further comprises a liquid at least partially surrounding at least one of said weight means and said means for producing a light beam to help to substantially eliminate undesired oscillations of said weight and said means for producing a light beam caused by acceleration of said inclinometer.

8. An inclinometer according to claim 7, wherein the sensitivity of said inclinometer is selected by selection of at least one of the length, material, and diameter of said optical rod, the mass and shape of said weight, the viscosity of said liquid, and the distance between a light emitting end of said means for producing a light beam and said light-sensitive surface area of said optical detector means.

9. An inclinometer according to claim 6, wherein said weight further comprises outwardly extending fin means and wherein said housing means further comprises a liquid at least partially surrounding at least one of said means for producing a light beam, said weight means, and said fin means to help to substantially eliminate undesired oscillations of said means for producing a light beam, said weight and fin means caused by acceleration of said inclinometer.

* * * * *